(12) United States Patent
Kobayashi (10) Patent No.: US 6,993,015 B2
(45) Date of Patent: Jan. 31, 2006

(54) APPARATUS FOR INTERCEPTING COMMUNICATION DATA IN A PACKET NETWORK

(76) Inventor: Toshihiko Kobayashi, c/o Oki Electric Industry Co., Ltd., 7-12 Toranomon 1-chome, Minato-ku, Tokyo (JP)

(*) Notice: Subject to any disclaimer, the term of this patent is extended or adjusted under 35 U.S.C. 154(b) by 864 days.

(21) Appl. No.: 09/874,363

(22) Filed: Jun. 6, 2001

(65) Prior Publication Data
US 2002/0018445 A1 Feb. 14, 2002

(30) Foreign Application Priority Data
Jul. 4, 2000 (JP) .............................. 2000-202525

(51) Int. Cl.
*H04L 12/66* (2006.01)
*H04L 12/56* (2006.01)
(52) U.S. Cl. ...................... 370/353; 370/356; 370/401
(58) Field of Classification Search ................ 370/352, 370/401, 350, 241, 353, 356, 250
See application file for complete search history.

(56) References Cited

U.S. PATENT DOCUMENTS 6,496,483 B1 * 12/2002 Kung et al. ................ 370/252
6,501,752 B1 * 12/2002 Kung et al. ................ 370/352
6,563,797 B1 * 5/2003 Kung et al. ................ 370/252

FOREIGN PATENT DOCUMENTS

WO WO 00/56019 * 9/2000

* cited by examiner

*Primary Examiner*—John Pezzlo
*Assistant Examiner*—Greory Sefcheck
(74) *Attorney, Agent, or Firm*—Rabin & Berdo, PC (57) ABSTRACT

A communication terminal apparatus and a communication intercepting apparatus performs a communication interception even on a communication network such as the Internet, an Intranet, or the like in which a communication route is not fixed. While the communication terminal apparatus is executing voice communication with another communication terminal apparatus, the communication intercepting apparatus transmits a monitor request signal to the communication terminal apparatus. When the monitor request signal is received, the communication terminal apparatus stores voice data which is transmitted to another communication terminal apparatus and voice data received from another communication terminal apparatus into a monitoring packet and transmits the monitoring packet to the communication intercepting apparatus. The communication intercepting apparatus receives the monitoring packet and reproduces the transmitted packets.

6 Claims, 6 Drawing Sheets

APPARATUS FOR INTERCEPTING COMMUNICATION DATA IN A PACKET NETWORK

BACKGROUND OF THE INVENTION

1. Field of the Invention

The invention relates to an apparatus for intercepting communication data of a communication terminal apparatus connected to a communication network such as the Internet, an Intranet, or the like.

2. Description of Related Art

Besides the techniques in the communication field that aim at the improvement of the ability and performance of communication, there are techniques which function as countermeasures or aim at the prevention of disaster and/or crime. The techniques providing countermeasures or aiming at the prevention of disaster and/or crime are mainly developed by request of public agencies. For example, such techniques include "immediate search of transmitter of emergency report", "trace back", "communication intercept", and the like.

In recent years, in association with the development of the Internet and Intranets, techniques for performing voice communication by using those communication networks are proposed. That is, in recent years, in place of a voice communication network using a conventional fixed telephone network, voice communication by the Internet, an Intranet, or the like are used widely. Owing to the expansion of the voice communication using the Internet, an Intranet, and the like, the establishment of an integrated network which integratedly handles a voice and data has been realized.

Even in the integrated network, it is necessary to realize the functions sought by public agencies as mentioned above, that is, "immediate search of transmitter of emergency report", "trace back", "communication intercept", and the like.

The communication intercepting technique used in the conventional fixed telephone network, however, cannot be applied to voice communication using the Internet, an Intranet, or the like due to the following reason.

In the voice communication of the fixed telephone network, a communication route is fixed for a period of time from a connection of a call to a release thereof. To intercept the communication using the fixed telephone network, therefore, it is sufficient to "fixedly" intercept the communication at a specific position on the communication route connecting two telephones to be observed.

In the communication using the Internet, an Intranet, or the like, on the other hand, communication data is transmitted and received in packets, and it's operation is based on an assumption that the communication route is dynamically changed even during connection of a call. Therefore, it is impossible to fixedly intercept the communication at a specific position.

OBJECTS AND SUMMARY OF THE INVENTION

For the reason described above, to provide countermeasures, the prevention and the like against crimes by a request of a public agency, a technique is required which can intercept communication even on a communication network such as the Internet, an Intranet, or the like in which a communication route is not fixed.

According to a first aspect of the invention, there is provided a communication terminal apparatus for allowing data which is transmitted and received to/from another communication terminal apparatus to be monitored by a communication intercepting apparatus, comprising: communication control means for controlling communication with another communication terminal apparatus and the communication intercepting apparatus; monitor request recognizing means for recognizing reception/non-reception of a monitor request signal from the communication intercepting apparatus while the communication control means is connecting a call to another communication terminal apparatus; and monitoring data generating means for, when the monitor request recognizing means recognizes the reception of the monitor request signal, generating monitoring data including communication data which is transmitted to another communication terminal apparatus and communication data received from another communication terminal apparatus and sending it to the communication control means.

According to the communication terminal apparatus of the above construction, when the monitor request signal is received, the monitoring data can be transmitted to the communication intercepting apparatus, so that the communication can be intercepted even in the case where the apparatus is used on a communication network in which a communication route is not fixed.

According to the second aspect of the invention, there is provided a communication intercepting apparatus for monitoring data which was transmitted and received between a communication terminal apparatus and another communication terminal apparatus, comprising: communication control means for performing a communication control to request the communication terminal apparatus to transmit monitoring data by using a monitor request signal and a communication control to receive the monitoring data from the communication terminal apparatus; and monitoring means for reproducing the monitoring data received by the communication control means.

According to the communication intercepting apparatus of the above construction, the monitoring data can be received from the communication terminal apparatus by the communication control means and, further, the monitoring data can be reproduced by the monitoring means, so that the communication can be intercepted even in the case where the apparatus is used on a communication network in which a communication route is not fixed.

DETAILED DESCRIPTION OF THE PREFERRED EMBODIMENT

An embodiment of the invention will be described hereinbelow with reference to the drawings. A size, a shape, and an arrangement relation of each component element in the diagram are merely schematically illustrated to an extent such that the invention can be understood and numerical value conditions, which will be explained hereinbelow, are merely shown as an example.

Figure 1:
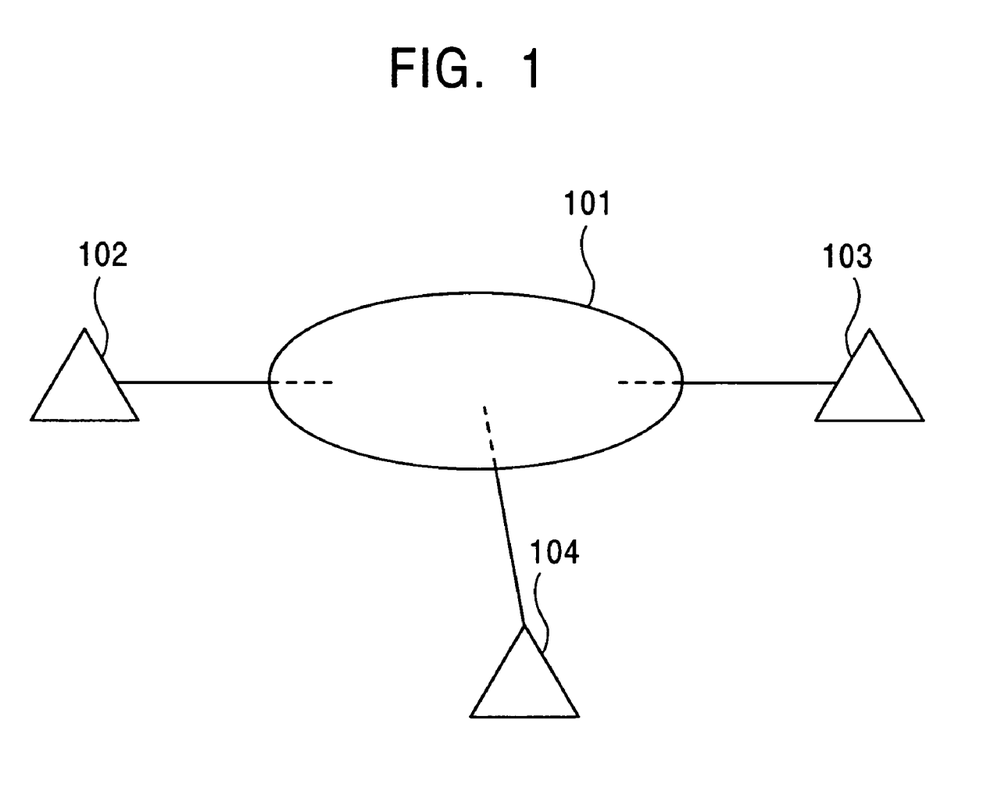
FIG. 1 is a conceptual diagram showing a whole construction of a communication network using a communication terminal apparatus and a communication intercepting apparatus according to an embodiment.

FIG. 1 is a conceptual diagram showing a whole construction of a communication network using a communication terminal apparatus and a communication intercepting apparatus according to the embodiment.

As shown in FIG. 1, a number of communication terminals for a voice (only two communication terminals 102 and 103 are shown in FIG. 1) and a monitor terminal 104 are connected to an IP (Internet protocol) network 101.

The IP network 101 is a communication network such as Internet, Intranet, or the like. The IP network 101 executes voice communication by using packet data using an IP (Internet protocol). When the communication terminals (for example, the communication terminal 102 and communication terminal 103) mutually perform voice communication through the IP network 101, a communication route is dynamically constructed in the IP network 101 by a router or the like (not shown). The communication route is dynamically changed even during connection of a call. The IP network can be also connected to a public communication network (not shown) through a gateway (not shown).

The communication terminals 102 and 103 transmit and receive voice data through the IP network 101. As communication terminals 102 and 103, for example, an Internet telephone, a personal computer, a terminal adapter, or the like can be used.

The monitor terminal 104 intercepts the voice communication of arbitrary communication terminals (communication terminals 102 and 103 in the example of FIG. 1) connected to the IP network 101. The communication interception is executed by receiving a monitoring packet from the communication terminals as targets.

Figure 2:
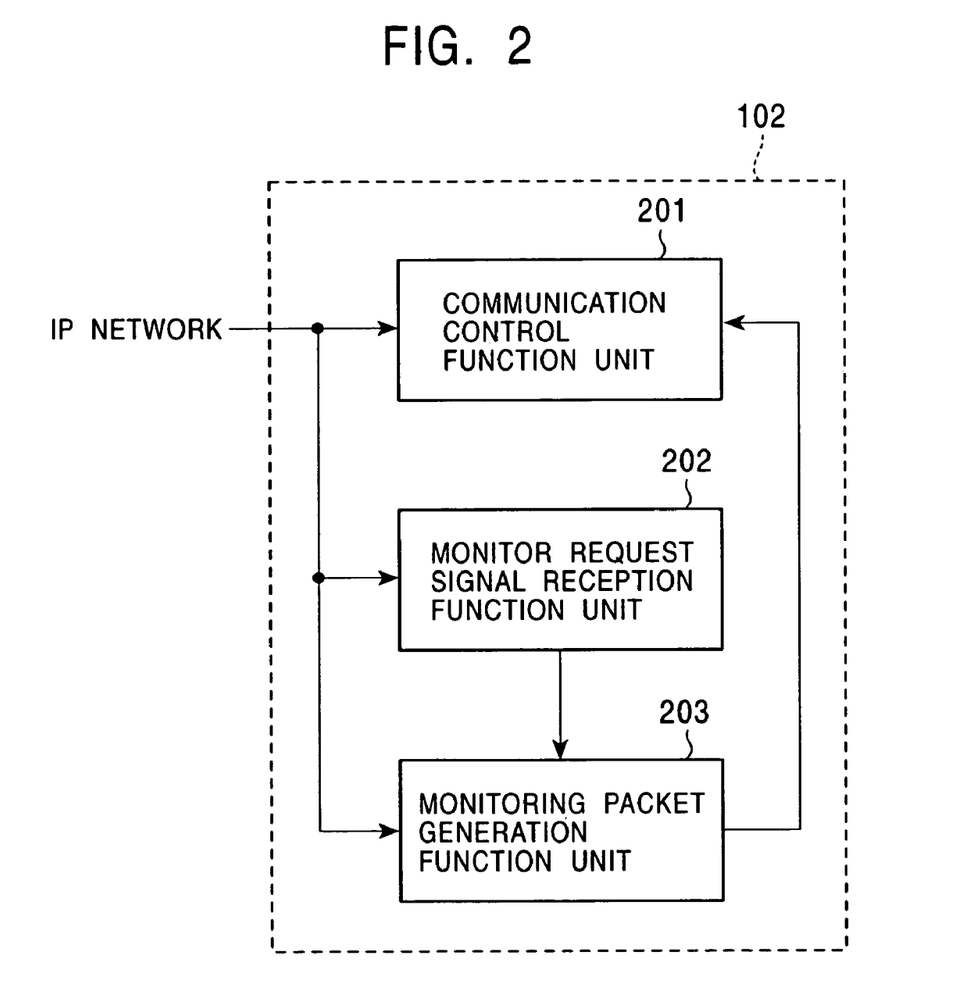
FIG. 2 is a functional block diagram showing an internal construction of a communication terminal according to the embodiment.

FIG. 2 is a functional block diagram showing an internal construction of the communication terminal 102.

As shown in FIG. 2, the communication terminal 102 has a communication control function unit 201, a monitor request signal reception function unit 202, and a monitoring packet generation function unit 203.

The communication control function unit 201 corresponds to a function for performing voice communication similar to that of a conventional Internet telephone or the like. That is, the communication control function unit 201 is connected to a speech partner (for example, the communication terminal 103) through the IP network 101 and executes a call connecting process, transmission and reception of the voice data (packet data), a call releasing process, and the like in accordance with a communication protocol similar to the conventional one. When a monitor request signal is received from the monitor terminal 104, the communication control function unit 201 executes a communication control for transmitting the monitoring packet to the monitor terminal 104.

The monitor request signal reception function unit 202 corresponds to a function for reading out the data from the reception packet and checking the presence or absence of the monitor request signal. In the embodiment, the monitor request signal is transmitted from the monitor terminal 104. As will be explained hereinlater, the monitor request signal is stored as an option, for example, in a Call Connect Request Message. When the reception of the monitor request signal is confirmed, the monitor request signal reception function unit 202 instructs the monitoring packet generation function unit 203 to generate a monitoring packet.

The monitoring packet generation function unit 203 corresponds to a function for generating the monitoring packet by receiving a command from the monitor request signal reception function unit 202. The monitoring packet generation function unit 203 stores the voice data which is received by the communication control function unit 201 and the voice data transmitted by the communication control function unit 201 to a transmission packet for monitoring. An address of a transmitting source (the monitor terminal 104 in the embodiment) of the monitor request signal is stored in a destination column of the monitoring transmission packet. The monitoring transmission packet is sent to the IP network 101 by the communication control function unit 201.

Since an internal construction of the communication terminal 103 is also similar to that of FIG. 2, its description is omitted.

Figure 3:
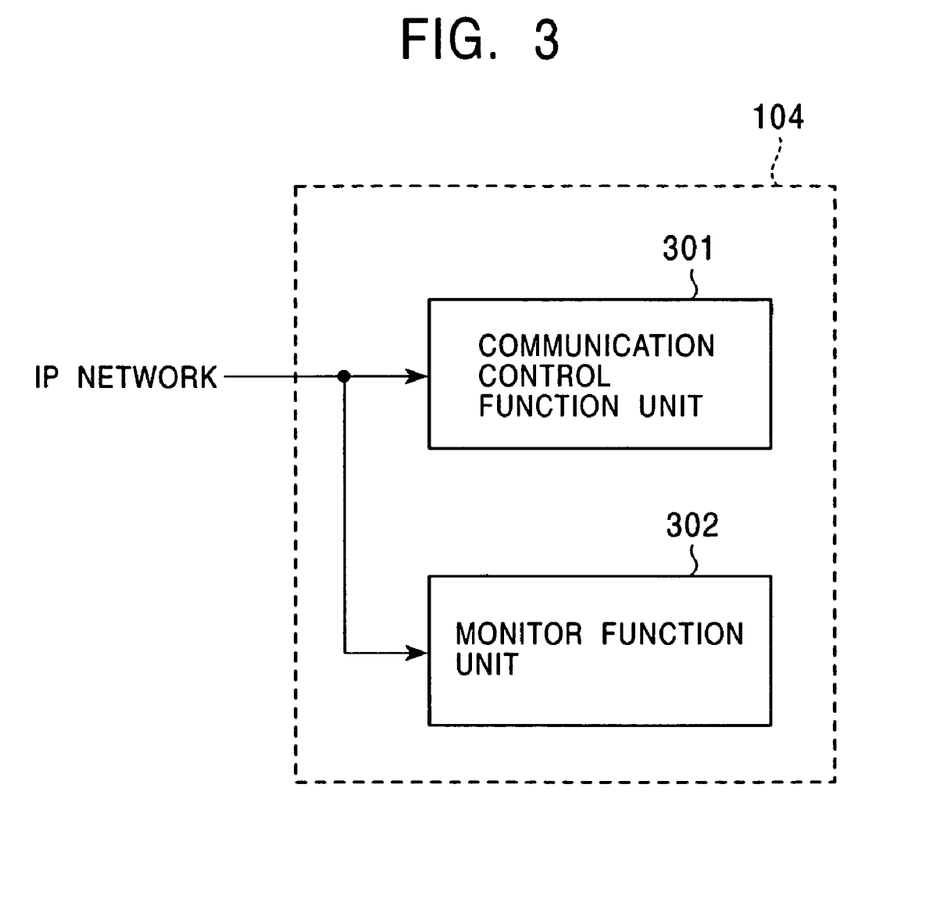
FIG. 3 is a functional block diagram showing an internal construction of the communication intercepting apparatus according to the embodiment.

FIG. 3 is a functional block diagram showing an internal construction of the monitor terminal 104.

As shown in FIG. 3, the monitor terminal 104 comprises a communication control function unit 301 and a monitor function unit 302.

The communication control function unit 301 performs a communication control for receiving a monitoring packet from the communication terminals (communication terminals 102 and 103 in the embodiment) as targets to be monitored. The communication control to receive the monitoring packet is started when the communication control function unit 301 transmits a monitor request signal to the communication terminals (which will be explained hereinlater). The monitor request signal can be stored as an option, for example, into a Recall Connect Request Message or the like.

The monitor function unit 302 reproduces a voice signal from the monitoring packet received by the communication control function unit 301 or displays a screen for the operation.

Figure 4:
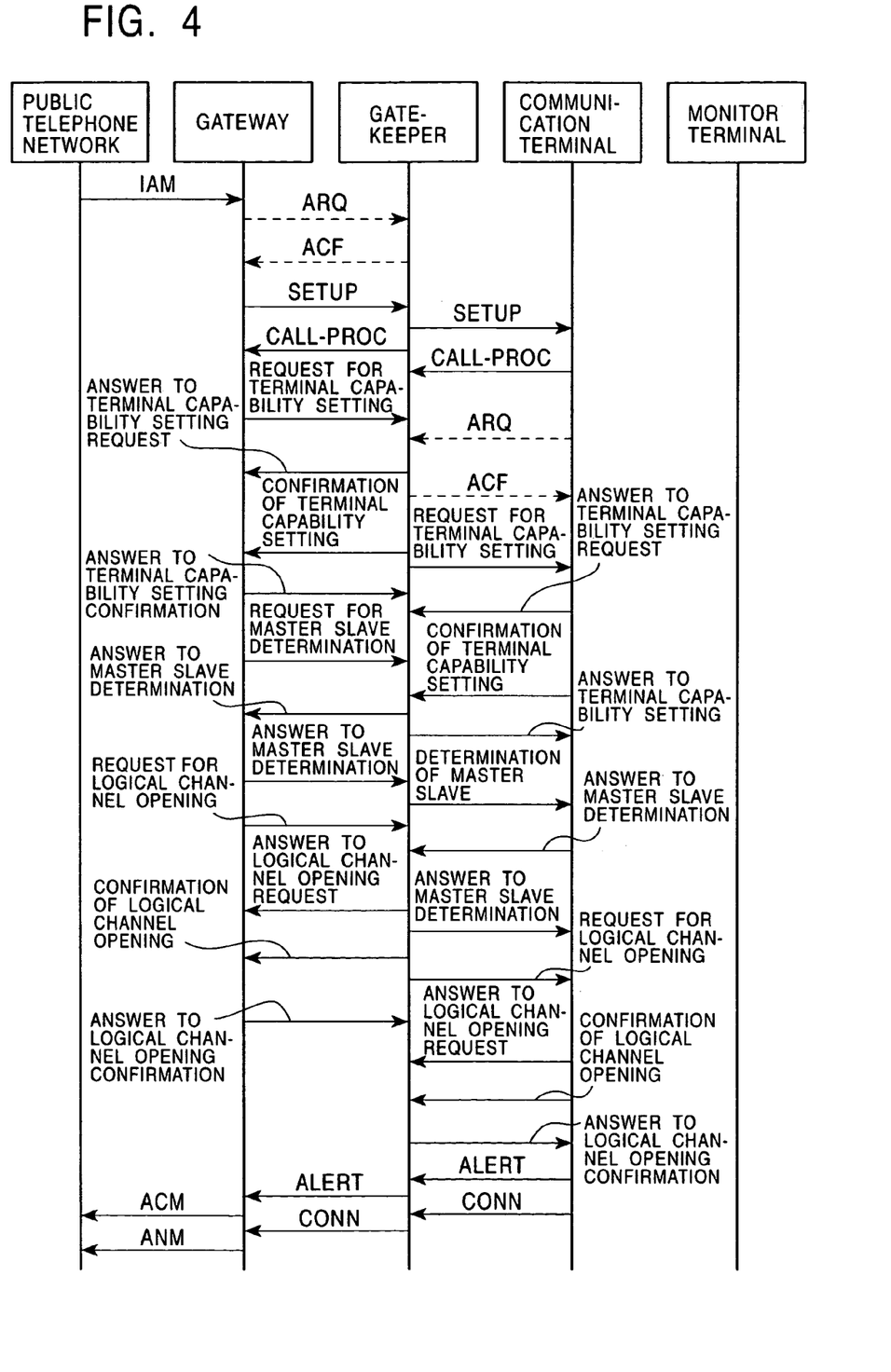
FIG. 4 is an operation explanatory diagram of the communication terminal apparatus according to the embodiment.
Figure 5:
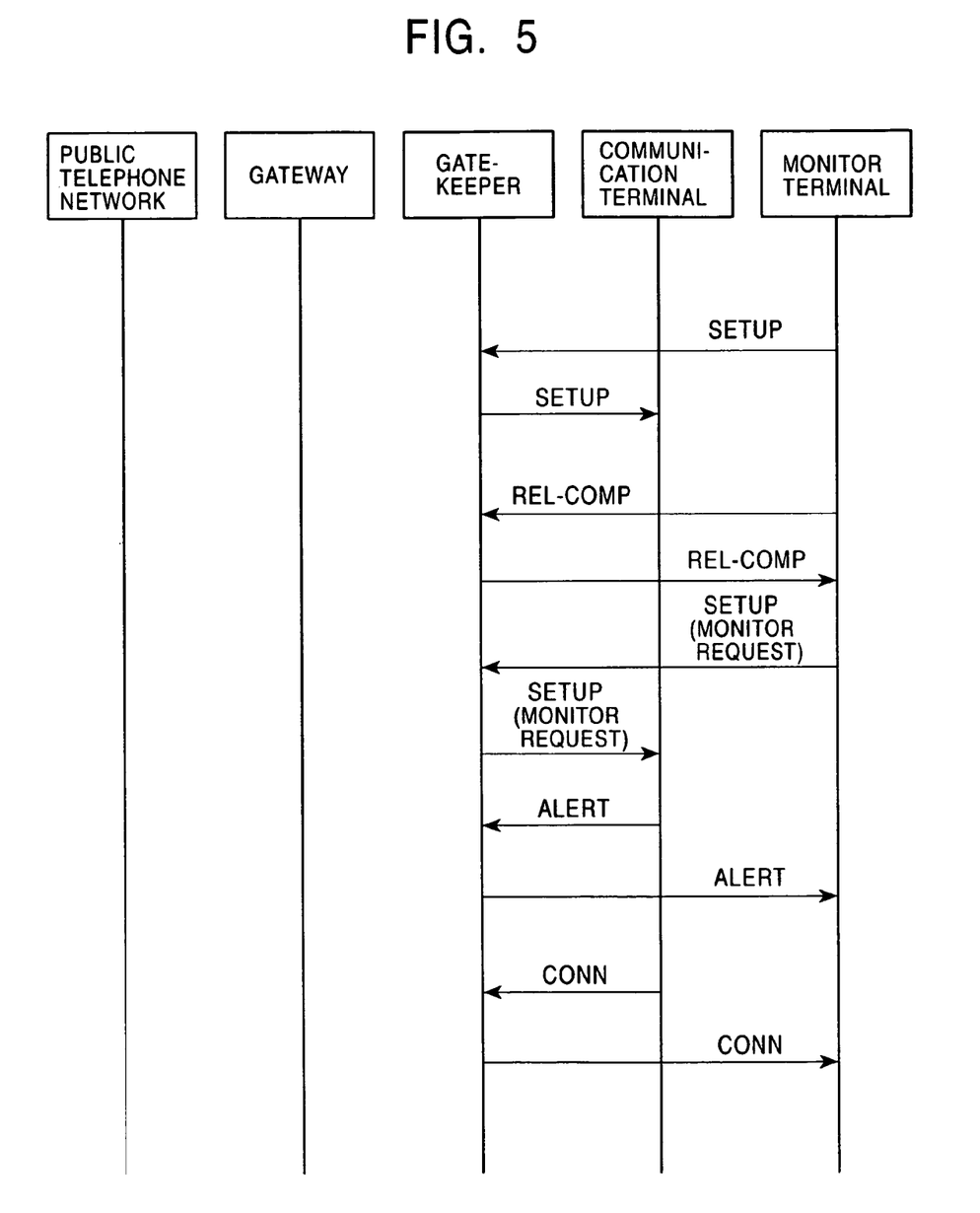
FIG. 5 is an operation explanatory diagram of the communication terminal apparatus and the communication intercepting apparatus according to the embodiment.
Figure 6:
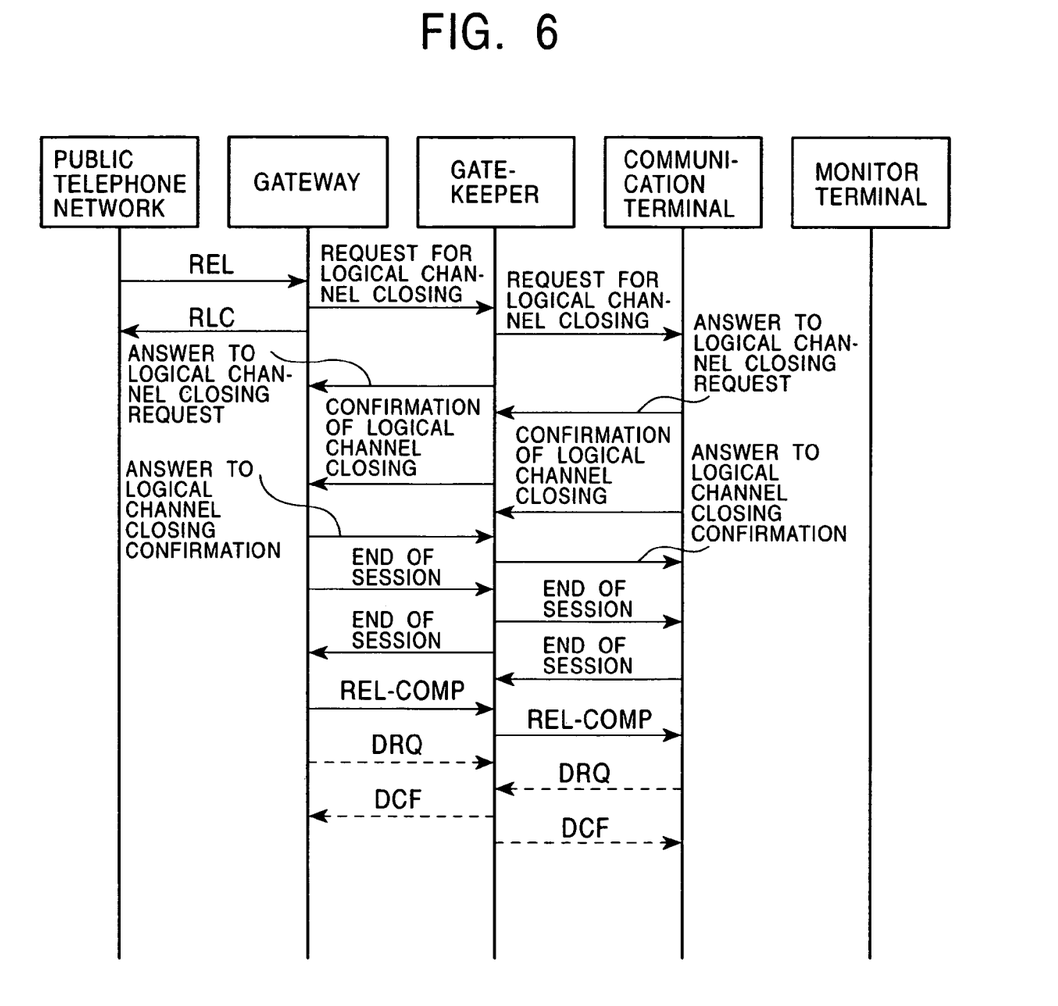
FIG. 6 is an operation explanatory diagram of the communication terminal apparatus according to the embodiment.

The whole operation in the embodiment will now be described with reference to FIGS. 4 to 6. Explanation will be made here with respect to the case where the contents of communication between a telephone (not shown) connected to the public telephone network and the communication terminal 102 are intercepted by the monitor terminal 104. It is assumed that the IP network 101 is the Internet.

A call connection between the telephone (not shown) connected to the public telephone network and the communication terminal 102 is first executed as follows (refer to FIG. 4).

First, a gateway in the Internet receives an IAM (Initial Address Message) signal from the public telephone network. To request an authentication and settle the number, the gateway transmits an Access Request Message to a gatekeeper in the Internet. The gatekeeper returns an Access Confirm Message as a response to the Access Request Message to the gateway.

When the Access Confirm Message is received, the gateway executes an Initial Address process which conforms with Q.931 and H.225.0 of the ITU-T Recommendation together with the gatekeeper. In this process, the Initial Address Message SETUP is transmitted to the gatekeeper. When the Initial Address Message SETUP is received, the gatekeeper returns an Under Call Establish process Message CALL#PROC to the gateway.

When the Initial Address Message SETUP is received from the gateway, the gatekeeper transmits the Initial Address Message SETUP to the communication terminal 102. When the Initial Address Message SETUP is received from the gatekeeper, the communication terminal 102 returns the Under Call Establish process Message CALL#PROC to the gatekeeper.

Subsequently, a Terminal Capability Set process, a master Slave Determination process, and an Open Logical Channel process which conform with R323 of the ITU-T Recommendation are executed between the gateway and the gatekeeper as follows.

In the Terminal Capability Set process, a Terminal Capability Set Request Message is first transmitted from the gateway to the gatekeeper. When this Request Message is received, the gatekeeper returns a Terminal Capability Set Request Answer Message to the gateway. After that, when the setting of the terminal capability is finished, the gatekeeper transmits a Terminal Capability Set confirm message to the gateway. When this Confirm Message is received, the gateway returns a Terminal Capability Set Confirm Answer Message to the gatekeeper.

In the Master Slave Determination process, a Master Slave Determination Request Message is first transmitted from the gateway to the gatekeeper. When this request message is received, the gatekeeper returns a Master Slave Determination Request Answer Message to the gateway. After that, when the determination of the master slave is finished, the gatekeeper transmits a Master Slave Determination Confirm Message to the gateway. When this confirm message is received, the gateway returns a Master Slave Determination Confirm Answer Message to the gatekeeper.

In the Open Logical Channel process, an Open Logical Channel Request Message is first transmitted from the gateway to the gatekeeper. When this request message is received, the gatekeeper returns an Open Logical Channel Request Answer Message to the gateway. After that, when the opening of the logical channel is finished, the gatekeeper transmits an Open Logical Channel Confirm Message to the gateway. When this confirm message is received, the gateway returns an Open Logical Channel Confirm Answer Message to the gatekeeper.

In parallel with the series of processes, the communication terminal 102 transmits an Access Request Message ARQ to the gatekeeper. As an answer to the Access Request Message, the gatekeeper returns an Access Confirm Message ACF to the communication terminal 102.

After that, a Terminal Capability Set process, a Master Slave Determination process, and an Open Logical Channel process which are similar to those mentioned above are executed between the gatekeeper and the communication terminal 102.

When the above sequence is finished, the telephone (not shown) of the public telephone network and the communication terminal 102 enter a communicating mode.

The communication terminal 102 subsequently transmits a calling signal ALERT to the gatekeeper. When this signal is received, the gatekeeper transmits the calling signal ALERT to the gateway. When this signal is received, the gateway transmits an ACM (Address Complete Message) to the public telephone network. Subsequently, the communication terminal 102 transmits a Connect Complete signal CONN to the gatekeeper. When this signal is received, the gatekeeper transmits the Connect Complete signal CONN to the gateway. When this signal is received, the gateway transmits an ANM (Answer Message) to the public telephone network. Speech communication between the telephone (not shown) of the public telephone network and the communication terminal 102 is thus started.

Subsequently, a communication interception by the monitor terminal 104 is executed as follows (see FIG. 5).

First, a Call Connect Request SETUP is transmitted from the monitor terminal 104 to the gatekeeper. When the Call Connect Request SETUP is received, the gatekeeper transmits the Call Connect Request SETUP to the communication terminal 102.

Since the communication terminal 102 is talking to the telephone (not shown) of the public telephone network, it returns a Call Release Request signal REL#COMP to the gatekeeper. When this request signal is received, the gatekeeper transmits the Call Release Request signal REL#COMP to the monitor terminal 104. In the monitor function unit 302 (see FIG. 3) of the monitor terminal 104, therefore, a busy tone (BT tone) is reproduced. By the reproduction of the BT tone, the operator of the monitor terminal 104 can recognize a fact that the communication terminal 102 is busy, namely, a fact that it can become a target of the communication interception. A list of the communication terminals which are busy can be also displayed on a screen of the monitor terminal 104 by using a network administrating apparatus or the like.

The monitor terminal 104 subsequently transmits a Recall Connect Request SETUP to which the monitor request signal has been added as an option to the gatekeeper on the basis of the operation of the operator. For example, it is sufficient to construct in a manner such that when the operator depresses a "#" key during the reproduction of the BT tone, the Recall Connect Request SETUP to which the monitor request signal has been added is transmitted.

When the Recall Connect Request SETUP is received, the gatekeeper transmits the Recall Connect Request SETUP to the communication terminal 102. When the Recall Connect Request SETUP is received, the communication terminal 102 transmits a calling signal ALERT to the gatekeeper. When the calling signal ALERT is received, the gatekeeper transmits the calling signal ALERT to the monitor terminal 104. The communication terminal 102 subsequently transmits the Connect Complete signal CONN to the gatekeeper. When the Connect Complete signal CONN is received, the gatekeeper transmits the Connect Complete signal CONN to the monitor terminal 104. The monitoring, that is, the communication interception by the monitor terminal 104 is, consequently, started.

In this monitor, as mentioned above, the monitoring packet generation function unit 203 (see FIG. 2) in the communication terminal 102 stores the reception voice data and the transmission voice data of the communication terminal 102 into the transmission packet for monitoring. The monitoring transmission packet is transmitted to the monitor terminal 104 through the gatekeeper. The monitor terminal 104 reproduces the voice data stored in the packet by the monitor function unit 302 (see FIG. 3).

A call between the telephone (not shown) connected to the public telephone network and the communication terminal 102 is finally released as follows (see FIG. 6).

First, the gateway in the Internet receives an REL (Release Message) from the public telephone network. The gateway returns an RLC (Release Complete Message) to the public telephone network and executes a Close Logical Channel process. In the Close Logical Channel process, the gateway first transmits a Close Logical Channel Request Message to the gatekeeper. When this Request Message is received, the gatekeeper returns a Close Logical Channel Request Answer Message to the gateway. After that, when the closing of the logical channel is finished, the gatekeeper transmits a Close Logical Channel Confirm Message to the gate way. When this Confirm Message is received, the gateway returns a Close Logical Channel Confirm Answer Message to the gatekeeper.

The End Session process is subsequently performed. In this process, the gateway first transmits an End Session Request Command to the gatekeeper. When this command is received, the gatekeeper returns an End Session Confirm Command to the gateway.

Subsequently, the gateway transmits the Call Release Request signal REL#COMP to the gatekeeper and, further, executes a Disconnect process. In this Disconnect process, a DRQ (Disconnect Request) signal is first transmitted from the gateway to the gatekeeper. The gatekeeper returns a DCF (Disconnect Confirm) signal to the gateway.

In parallel with the above series of processes, a Close Logical Channel process, an End Session process, and a Disconnect process which are similar to those mentioned above are also executed between the gatekeeper and the communication terminal 102.

The communication, consequently, between the telephone (not shown) connected to the public telephone network and the communication terminal 102 is completed.

According to the embodiment as mentioned above, the communication between the communication terminals 102 and 103 connected to the IP network 101 can be intercepted.

As described in detail above, according to the communication terminal apparatus and the communication intercepting apparatus of the invention, a communication interception can be performed even in a communication network such as the Internet, an Intranet, or the like in which a communication route is not fixed. The invention is, therefore, effective as a countermeasure, or a prevention against crime.

What is claimed is:

1. A communication terminal apparatus for allowing data which is transmitted to and received from another communication terminal apparatus through a packet network to be monitored by a communication intercepting apparatus connected to said packet network, said communication terminal apparatus comprising:

communication control means for controlling communication by said communication terminal apparatus with said another communication terminal apparatus and with said communication intercepting apparatus;

monitor request recognizing means for recognizing reception of a monitor request signal from said communication intercepting apparatus while said communication terminal apparatus is busy communicating with said another communication terminal apparatus; and monitoring data generating means for, in the case where said monitor request recognizing means recognizes the reception of said monitor request signal, generating monitoring data including communication data which is transmitted to said another communication terminal apparatus and communication data received from said another communication terminal apparatus and sending said monitoring data to said communication control means for transmission to said communication intercepting apparatus, wherein said communication control means also controls the reception of a call connection request signal which is transmitted by said communication intercepting apparatus for determining whether said communication terminal apparatus is busy communicating with said another communication terminal apparatus.

2. An apparatus according to claim 1, wherein said monitor request signal is received by said receiving means as an option added to a recall connect request signal.

3. A communication intercepting apparatus connected to a packet network for monitoring data which is transmitted and received through said packet network between a communication terminal apparatus and another communication terminal apparatus, said communication intercepting apparatus comprising:

communication control means for controlling the transmission of a monitor request signal to request said communication terminal apparatus to transmit monitoring data while said communication terminal apparatus is busy communicating with said another communication terminal apparatus, and for controlling the reception of said monitoring data from said communication terminal apparatus; and monitoring means for reproducing said monitoring data received by said communication control means, wherein said communication control means also controls the transmission of a call connection request signal to said communication terminal apparatus for determining whether said communication terminal apparatus is busy communicating with said another communication terminal apparatus.

4. An apparatus according to claim 3, wherein said communication control means transmits said monitor request signal as an option added to a recall connect request signal, thereby requesting said communication terminal apparatus to transmit said monitoring data.

5. A communication intercepting apparatus connected to a packet network for monitoring data which is transmitted and received through said packet network between a communication terminal apparatus and another communication terminal apparatus, said communication intercepting apparatus comprising:

communication control means for controlling the transmission of a monitor request signal to request said communication terminal apparatus to transmit monitoring data while said communication terminal apparatus is busy communicating with said another communication terminal apparatus, and for controlling the reception of said monitoring data from said communication terminal apparatus; and monitoring means for reproducing said monitoring data received by said communication control means, wherein said communication control means also controls the reception of a call release request signal indicating that said communication terminal apparatus is busy communicating with said another communication terminal apparatus, and said monitoring means produces a busy tone when said call release request signal is received by said communication control means.

6. A communication terminal apparatus for allowing data which is transmitted to and received from another communication terminal apparatus through a packet network to he monitored by a communication intercepting apparatus connected to said packet network said communication terminal apparatus comprising.

communication control means for controlling communication by said communication terminal apparatus with said another communication terminal apparatus and with said communication intercepting apparatus;

monitor request recognizing means for recognizing reception of a monitor request signal from said communication intercepting apparatus while said communication terminal apparatus is busy communicating with said another communication terminal apparatus; and monitoring data generating means for, in the case where said monitor request recognizing means recognizes the reception of said monitor request signal generating monitoring data including communication data which is transmitted to said another communication terminal apparatus and communication data received from said another communication terminal apparatus and sending said monitoring data to said communication control means for transmission to said communication intercepting apparatus, wherein said communication control means also controls the transmission of a call release request signal to said communication intercepting apparatus for indicating that said communication terminal apparatus is busy communicating with said another communication terminal apparatus.

* * * * *

UNITED STATES PATENT AND TRADEMARK OFFICE
CERTIFICATE OF CORRECTION

PATENT NO. : 6,993,015 B2
APPLICATION NO. : 09/874363
DATED : January 31, 2006
INVENTOR(S) : Toshihiko Kobayashi

It is certified that error appears in the above-identified patent and that said Letters Patent is hereby corrected as shown below:

Title Page:
After Item (76) Inventor, please add:

Item (73) Assignee: Oki Electric Industry, Co., Ltd., Tokyo (JP)

Signed and Sealed this

Twenty-second Day of August, 2006

JON W. DUDAS
*Director of the United States Patent and Trademark Office*